US009304311B2

(12) United States Patent
Schainholz

(10) Patent No.: US 9,304,311 B2
(45) Date of Patent: Apr. 5, 2016

(54) ELECTRONIC TABLET MAGNIFYING CASE DEVICE

(71) Applicant: Daniel C. Schainholz, San Francisco, CA (US)

(72) Inventor: Daniel C. Schainholz, San Francisco, CA (US)

( * ) Notice: Subject to any disclaimer, the term of this patent is extended or adjusted under 35 U.S.C. 154(b) by 8 days.

(21) Appl. No.: 14/252,315

(22) Filed: Apr. 14, 2014

(65) Prior Publication Data

US 2015/0293344 A1 Oct. 15, 2015

(51) Int. Cl.
G02B 7/02 (2006.01)
G02B 25/00 (2006.01)
G06F 1/16 (2006.01)

(52) U.S. Cl.
CPC ............ G02B 25/005 (2013.01); G06F 1/1609 (2013.01); G06F 1/1628 (2013.01); G06F 2200/1633 (2013.01)

(58) Field of Classification Search
CPC .......... G02B 7/23; G02B 23/125; G02B 7/02; G02B 7/028; G02B 7/14; G02B 7/04; G02B 7/08; G02B 7/026; G02B 7/021; G02B 25/002; G03B 17/14; G02C 7/08; G11B 7/0932
USPC ................................................. 359/811–830
See application file for complete search history.

(56) References Cited

U.S. PATENT DOCUMENTS

| 4,379,618 | A | 4/1983 | Tall | |
|---|---|---|---|---|
| 5,048,928 | A | 9/1991 | Davis | |
| D361,993 | S | 9/1995 | Egly et al. | |
| 5,471,347 | A * | 11/1995 | Galiani | 359/807 |
| 5,847,883 | A | 12/1998 | Rispoli, Sr. | |
| 6,614,604 | B1 * | 9/2003 | Budde | 359/817 |
| 7,495,846 | B1 | 2/2009 | Kappel | |
| 7,558,009 | B1 | 7/2009 | Faires | |
| 7,567,394 | B1 | 7/2009 | Monte | |
| 7,647,881 | B2 | 1/2010 | Kraus | |
| 8,294,998 | B1 | 10/2012 | Samo | |
| 2004/0156125 | A1* | 8/2004 | Graham et al. | 359/804 |
| 2006/0290654 | A1* | 12/2006 | Wang | 345/156 |
| 2009/0237813 | A1* | 9/2009 | Erlich | 359/809 |
| 2009/0257136 | A1 | 10/2009 | Liu | |
| 2014/0128132 | A1* | 5/2014 | Cox, III | 455/575.8 |

* cited by examiner

Primary Examiner — Dawayne A Pinkney

(57) ABSTRACT

An electronic tablet magnifying case device protects an electronic tablet and supports the tablet in a use position proximate a magnifying lens to reduce eye strain. The device includes a base and a first panel pivotally coupled to and extending from a first lateral side of the base. Each of a plurality of brackets is coupled to the first panel wherein an electronic tablet is couplable to the first panel on an interior face of the first panel. A second panel is pivotally coupled to and extends from a second lateral side. The second panel includes a magnifying lens pivotable to a use position wherein the magnifying lens is directed towards the interior face of the first panel when the first panel is in an extended position relative to the base.

9 Claims, 4 Drawing Sheets

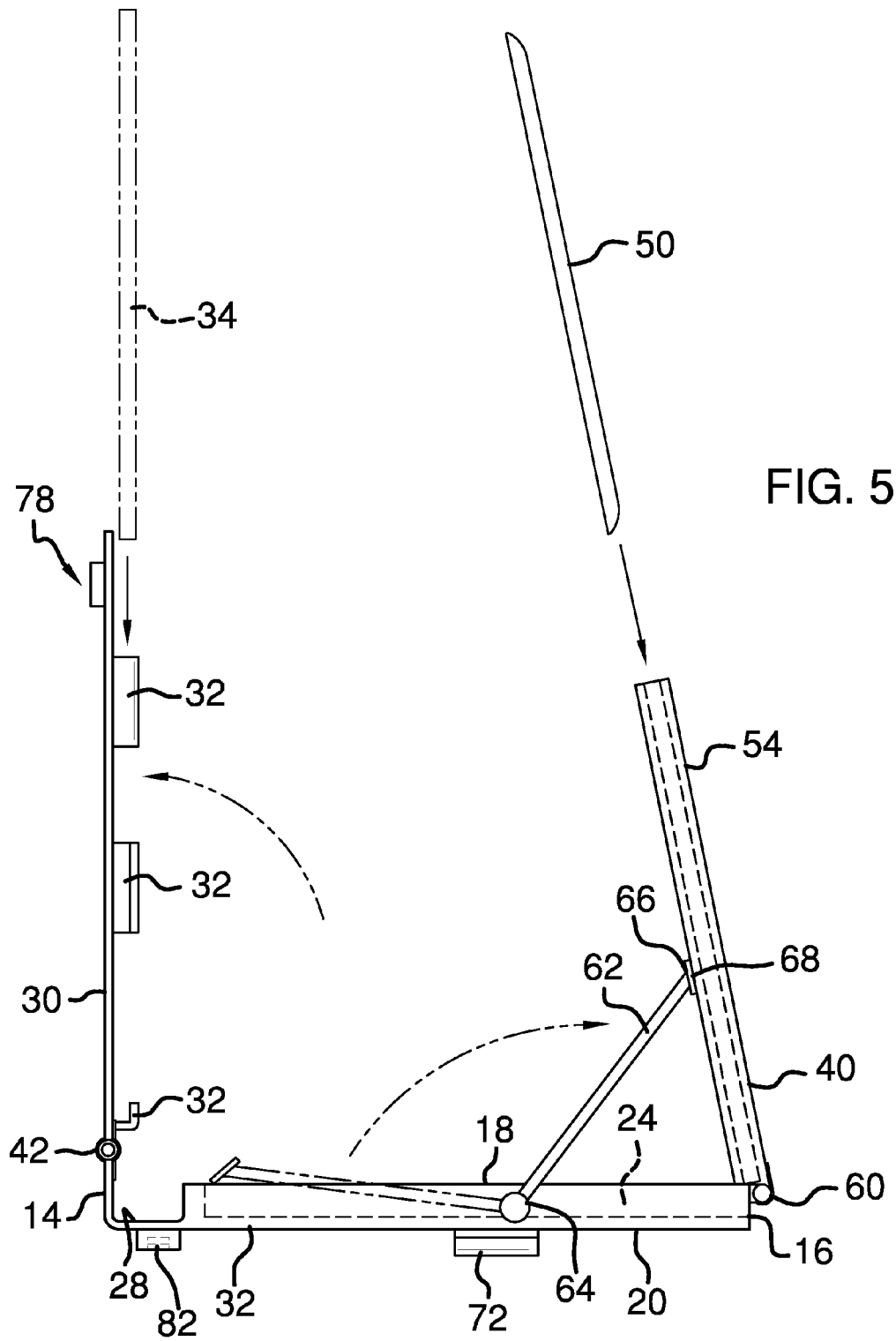

ELECTRONIC TABLET MAGNIFYING CASE DEVICE

BACKGROUND OF THE DISCLOSURE

Field of the Disclosure

The disclosure relates to case devices and more particularly pertains to a new case device for protecting an electronic tablet and supporting the tablet in a use position proximate a magnifying lens to reduce eye strain.

SUMMARY OF THE DISCLOSURE

An embodiment of the disclosure meets the needs presented above by generally comprising a base and a first panel pivotally coupled to and extending from a first lateral side of the base. Each of a plurality of brackets is coupled to the first panel wherein an electronic tablet is couplable to the first panel on an interior face of the first panel. A second panel is pivotally coupled to and extends from a second lateral side. The second panel includes a magnifying lens pivotable to a use position wherein the magnifying lens is directed towards the interior face of the first panel when the first panel is in an extended position relative to the base.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a partially exploded side view of an embodiment of the disclosure.

DESCRIPTION OF THE PREFERRED EMBODIMENT

Figure 1:
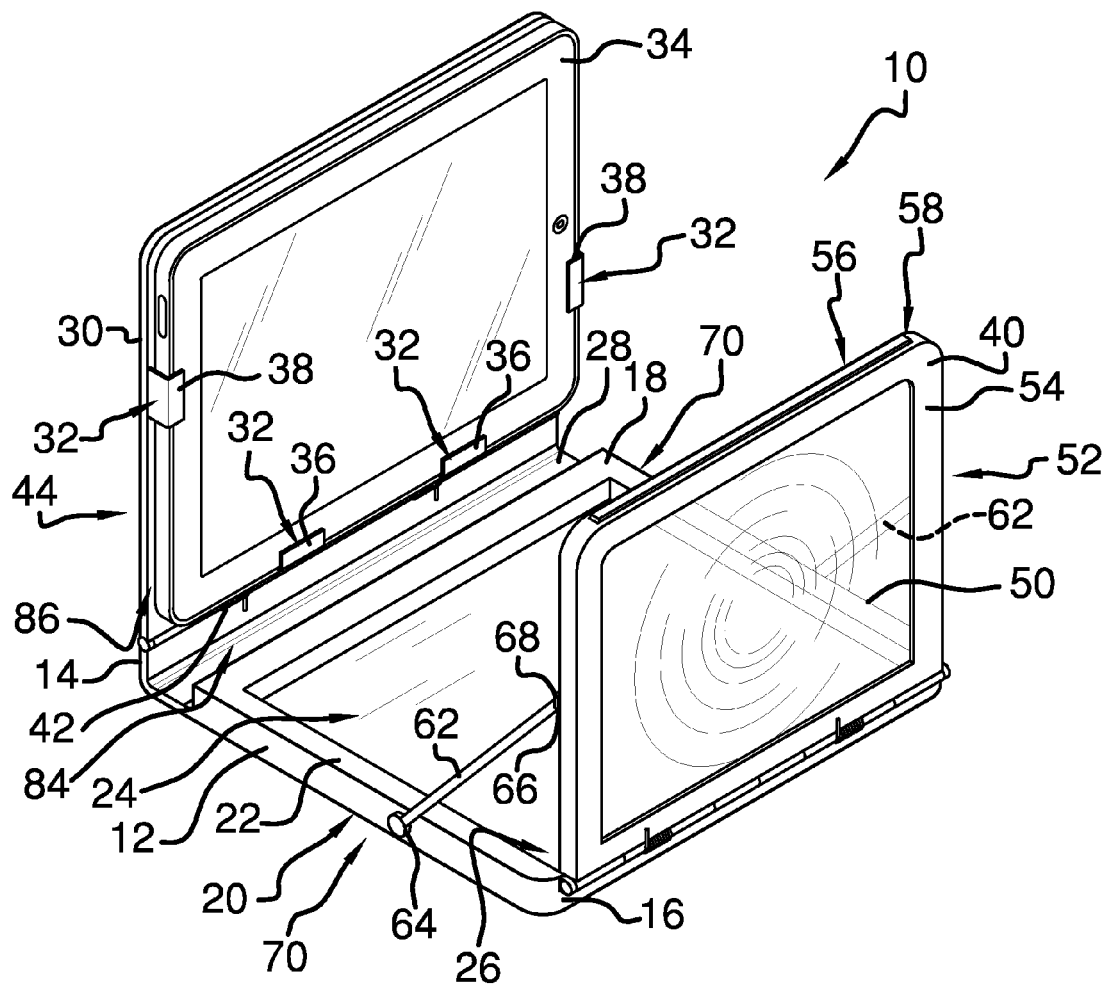
FIG. 1 is a top front side perspective view of a electronic tablet magnifying case device according to an embodiment of the disclosure in a use position.
Figure 2:
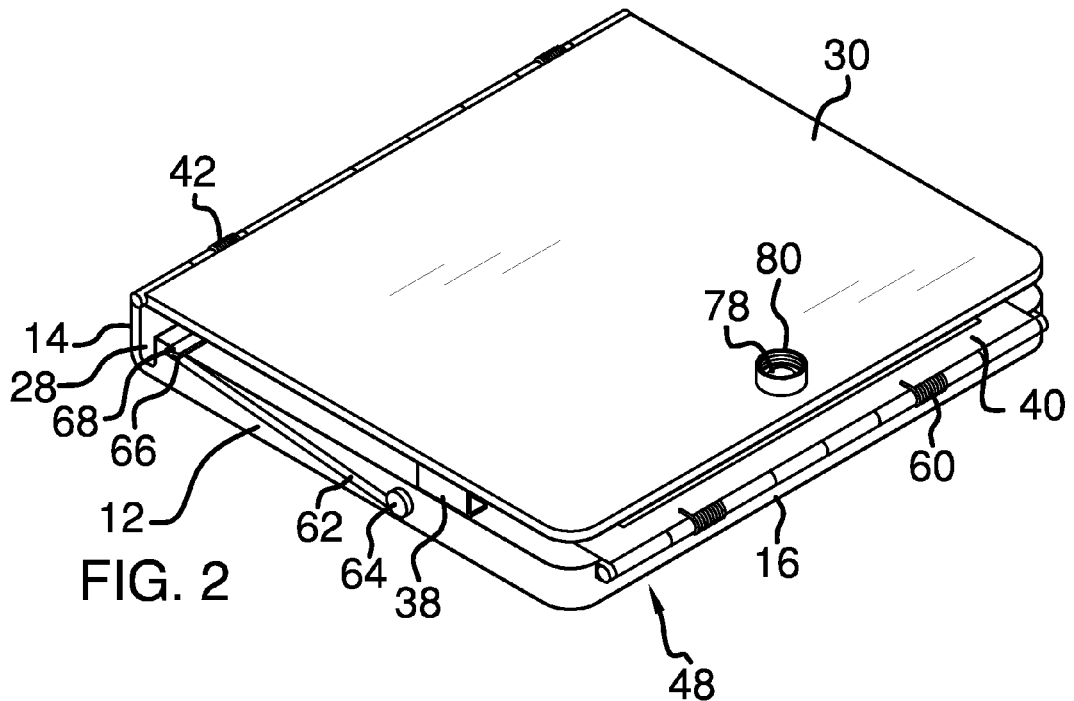
FIG. 2 is a top front side perspective view of an embodiment of the disclosure in a closed position.

With reference now to the drawings, and in particular to FIGS. 1 through 5 thereof, a new case device embodying the principles and concepts of an embodiment of the disclosure and generally designated by the reference numeral 10 will be described.

As best illustrated in FIGS. 1 through 5, the electronic tablet magnifying case device 10 generally comprises a planar base 12 having a first lateral side 14, a second lateral side 16, an upper surface 18, and a bottom surface 20. The base 12 may further comprise a substantially U-shaped perimeter wall 22 extending between the upper surface 18 and the bottom surface 20. The perimeter wall 22 defines a well 24 between the upper surface 18 and the bottom surface 20. An open side 26 of the well 24 is directed towards the second lateral side 16. A channel 28 may extend along a medial section 84 of the perimeter wall 22 parallel to the first lateral side 14.

A first panel 30 is pivotally coupled to and extends from the first lateral side 14. A plurality of brackets 32 is coupled to the first panel 30 wherein the first panel 30 is configured for coupling to an electronic tablet 34 such that the electronic tablet 34 is positioned on an interior face 86 of the first panel 30. The brackets 32 may comprise bottom brackets 36 and end brackets 38. The end brackets 38 may be offset from each other such that they are not aligned transversely with respect to the electronic tablet 34. A first side spring hinge 42 couples the first panel 30 to the first lateral side 14. The first side spring hinge 42 supports the first panel 30 in an extended position 44 relative to the base 12 in which the first panel 30 is substantially at a right angle with respect to the base 12.

A second panel 40 is pivotally coupled to and extends from the second lateral side 16. The second panel 40 is positioned within the well 24 when the second panel 40 is pivoted into a storage position 48. The second panel 40 comprises a magnifying lens 50 which may be a Fresnel lens. The second panel 40 is pivotable to a use position 52 wherein the magnifying lens 50 is directed towards the interior face 86 of the first panel 30 when the first panel 30 is in the extended position 44 relative to the base 12. The second panel 40 further comprises a frame 54 extending around the magnifying lens 50. The magnifying lens 50 is selectively separable from the frame 54. The frame 54 has an open side 56 which may be achieved by providing a slit 58 in the frame 54. The magnifying lens 50 is slidable from the frame 54 through the open side 56 of the frame 54. A second side spring hinge 60 couples the second panel 40 to the second lateral side 16.

An arm 62 has a first end 64 pivotally coupled to the base 12. The arm 62 has a second end 66 selectively positionable supporting the second panel 40 wherein the arm 62 supports the second panel 40 in the use position 52. The use position 52 may be a right angle to the base 12 or less than a right angle depending on preference. An abutment member 68 is coupled to the second end 66 of the arm 62. The abutment member 68 is planar and may be skewed relative to a longitudinal axis of the arm 62. A single arm 62 may be provided or a pair of similarly structured arms 62 may be provided with each arm 62 is positioned on opposite sides 70 of the base 12.

A hand strap 72 has opposite ends 74 coupled to the bottom surface 20 of the base 12 wherein the hand strap 72 is configured for receiving a hand between a medial section 76 of the hand strap 72 and the bottom surface 20 of the base 12 wherein the base 12 is coupled to the hand. An opening 78 extends through the first panel 30. The opening 78 is positioned such that the opening 78 is configured to align with a camera of the electronic tablet 34 when the electronic tablet 34 is coupled to the first panel 30. The opening 78 may have threading 80 wherein the opening 78 is configured for threaded coupling of an extrinsic lens attachment to the first panel 30.

Figure 3:
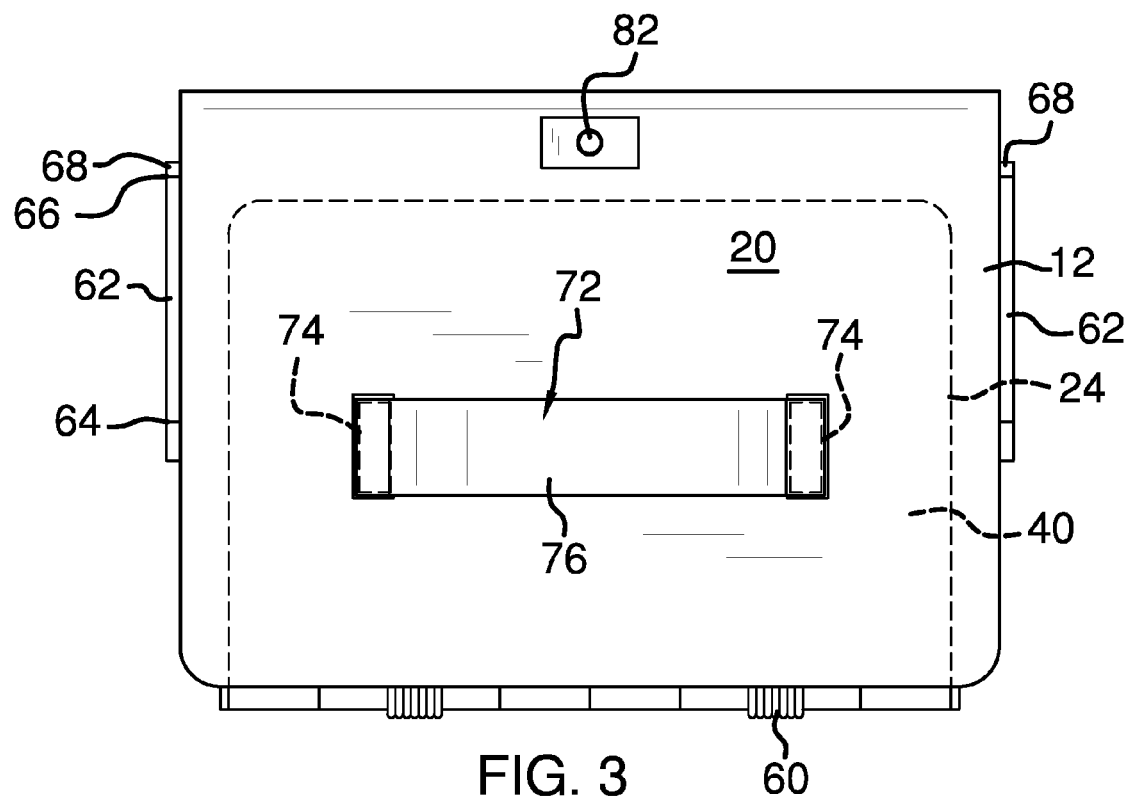
FIG. 3 is a back view of an embodiment of the disclosure.
Figure 4:
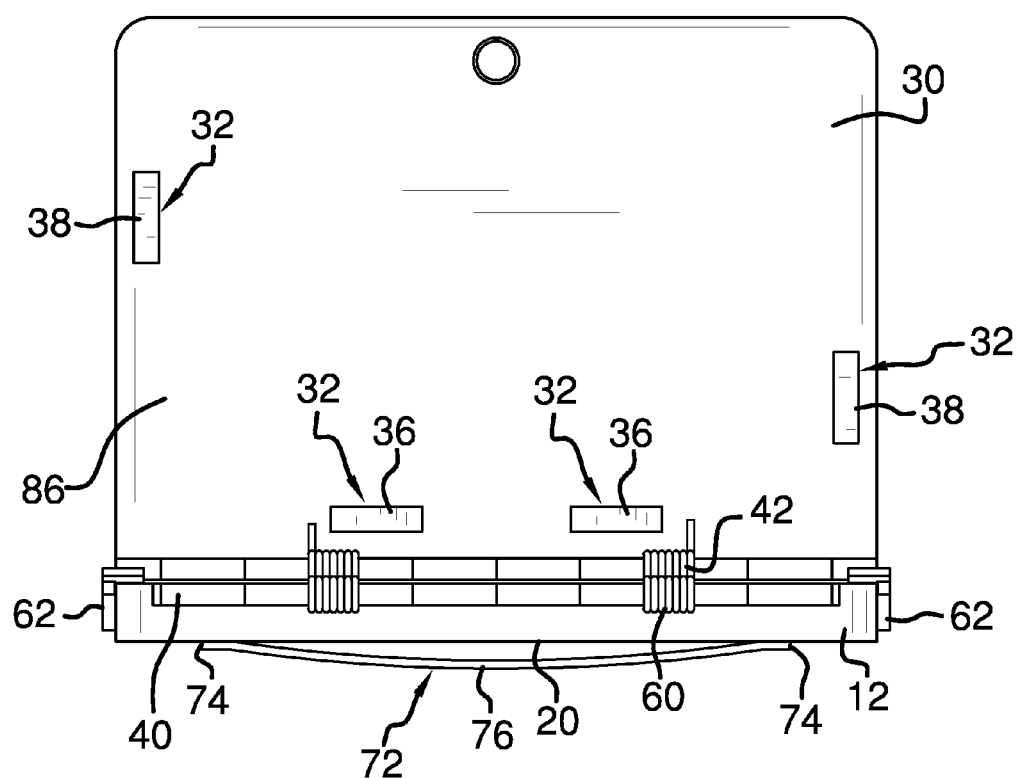
FIG. 4 is a front view of an embodiment of the disclosure in a partially open position.

As seen in FIGS. 3 and 5, a threaded receiver 82 may be coupled to the bottom surface 20 of the base 12. The threaded receiver 82 is configured for receiving a threaded shaft of a coupler conventionally used for attaching cameras and the like to a tripod. The threaded receiver 82 may be inset into the base 12. Spacing between the channel 28 and the well 24 may be provided to allow the threaded receiver to be inset into the base 12 if desired. The threaded receiver 82 may be in the form of a detachable insert coupled to the base 12 in a conventional manner.

In use, the electronic tablet 34 is coupled to the first panel 30 and held by the brackets 32. The first panel 30 and second panel 40 may each be pivoted positioning the magnifying lens 50 such that a display of the electronic tablet 34 is magnified by viewing through the magnifying lens 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An electronic tablet magnifying case device comprising:
   a base having a first lateral side, a second lateral side, an upper surface, and a bottom surface;
   a first panel pivotally coupled to and extending from said first lateral side;
   a plurality of brackets coupled to said first panel wherein said first panel being configured for coupling to an electronic tablet wherein said electronic tablet being positioned on an interior face of said first panel; and
   a second panel pivotally coupled to and extending from said second lateral side, said second panel comprising a magnifying lens, said second panel being pivotable to a use position wherein said magnifying lens being directed towards said interior face of said first panel when said first panel is in an extended position relative to said base, said second panel further comprising a frame extending around said magnifying lens, said frame having an open side, said magnifying lens being slidable from said frame through said open side of said frame;
   a first side spring hinge coupling said first panel to said first lateral side, said first side spring hinge supporting said first panel in said extended position relative to said base;
   an opening extending through said first panel, said opening being positioned such that said opening is configured to align with a camera of said electronic tablet when said electronic tablet is coupled to said first panel.

2. The device of claim 1, further comprising a second side spring hinge coupling said second panel to said second lateral side.

3. The device of claim 1, further comprising an arm having a first end pivotally coupled to said base, said arm having a second end selectively positionable supporting said second panel wherein said arm supports said second panel in said use position.

4. The device of claim 3, further comprising an abutment member being coupled to said second end of said arm, said abutment member being planar, said abutment member being skewed relative to a longitudinal axis of said arm.

5. The device of claim 1, further comprising a hand strap having opposite ends coupled to said bottom surface of said base wherein said hand strap being configured for receiving a hand between a medial section of said hand strap and said bottom surface of said base wherein said base is coupled to said hand.

6. The device of claim 1, further comprising said base comprising a perimeter wall extending between said upper surface and said bottom surface, said perimeter wall defining a well between said upper surface and said bottom surface, said second panel being positioned within said well when said second panel is pivoted into a storage position.

7. The device of claim 1, further comprising said magnifying lens being selectively separable from said frame.

8. The device of claim 1, further comprising said opening having threading wherein said opening is configured for threaded coupling of an extrinsic lens attachment to said first panel.

9. An electronic tablet magnifying case device comprising:
   a base having a first lateral side, a second lateral side, an upper surface, and a bottom surface, said base comprising a perimeter wall extending between said upper surface and said bottom surface, said perimeter wall defining a well between said upper surface and said bottom surface;
   a first panel pivotally coupled to and extending from said first lateral side;
   a plurality of brackets coupled to said first panel wherein said first panel is configured for coupling to an electronic tablet wherein said electronic tablet is positioned on an interior face of said first panel;
   a second panel pivotally coupled to and extending from said second lateral side, said second panel being positioned within said well when said second panel is pivoted into a storage position, said second panel comprising a magnifying lens, said second panel being pivotable to a use position wherein said magnifying lens is directed towards said interior face of said first panel when said first panel is in an extended position relative to said base, said second panel further comprising a frame extending around said magnifying lens, said magnifying lens being selectively separable from said frame, said frame having an open side, said magnifying lens being slidable from said frame through said open side of said frame;
   a first side spring hinge coupling said first panel to said first lateral side, said first side spring hinge supporting said first panel in said extended position relative to said base;
   a second side spring hinge coupling said second panel to said second lateral side;
   an arm having a first end pivotally coupled to said base, said arm having a second end selectively positionable supporting said second panel wherein said arm supports said second panel in said use position;
   an abutment member being coupled to said second end of said arm, said abutment member being planar, said abutment member being skewed relative to a longitudinal axis of said arm;
   a hand strap having opposite ends coupled to said bottom surface of said base wherein said hand strap is configured for receiving a hand between a medial section of said hand strap and said bottom surface of said base wherein said base is coupled to said hand; and
   an opening extending through said first panel, said opening being positioned such that said opening is configured to align with a camera of said electronic tablet when said electronic tablet is coupled to said first panel, said opening having threading wherein said opening is configured for threaded coupling of an extrinsic lens attachment to said first panel.

* * * * *